United States Patent
Wire et al.

(10) Patent No.: US 11,122,744 B2
(45) Date of Patent: Sep. 21, 2021

(54) COMBINE HARVESTER TAILINGS MANAGEMENT

(71) Applicant: AGCO Corporation, Duluth, GA (US)

(72) Inventors: Jason Wire, Newton, KS (US); Bernard Dean Regier, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 186 days.

(21) Appl. No.: 16/269,972

(22) Filed: Feb. 7, 2019

(65) Prior Publication Data
US 2019/0327900 A1    Oct. 31, 2019

Related U.S. Application Data

(60) Provisional application No. 62/662,810, filed on Apr. 26, 2018.

(51) Int. Cl.
*A01F 12/60* (2006.01)
*A01F 12/44* (2006.01)
*A01D 41/12* (2006.01)
*A01F 12/34* (2006.01)

(52) U.S. Cl.
CPC .......... *A01F 12/60* (2013.01); *A01D 41/1208* (2013.01); *A01D 41/1217* (2013.01); *A01F 12/34* (2013.01); *A01F 12/446* (2013.01)

(58) Field of Classification Search
CPC ........ A01F 12/44; A01F 12/446; A01F 12/60; A01F 12/52; A01F 12/54; A01F 12/42; A01D 41/1208; A01D 41/1217
See application file for complete search history.

(56) References Cited

U.S. PATENT DOCUMENTS

| | | | | |
|---|---|---|---|---|
| 1,355,383 A | * | 10/1920 | Brown | A01F 12/52 209/317 |
| 1,382,901 A | * | 6/1921 | Gebhardt | A01F 12/52 209/321 |
| 1,402,068 A | * | 1/1922 | Himmel | A01F 12/385 460/98 |
| 1,468,849 A | * | 9/1923 | West | A01F 12/52 209/370 |
| 1,880,387 A | * | 10/1932 | Gruver | A01F 12/30 209/342 |
| 1,928,216 A | * | 9/1933 | Apel | A01F 12/446 209/397 |
| 2,186,210 A | * | 1/1940 | Scheel | A01F 12/44 209/318 |
| 2,190,262 A | * | 2/1940 | Geist | A01F 12/446 460/91 |

(Continued)

FOREIGN PATENT DOCUMENTS

| | | | | |
|---|---|---|---|---|
| FR | 1257037 A | * | 3/1961 | A01F 12/44 |
| WO | 2008/040921 A1 | | 4/2008 | |

OTHER PUBLICATIONS

UK Intellectual Property Office, Search Report for Related UK Application No. GB1815227.2, dated Mar. 19, 2019.

*Primary Examiner* — Thomas B Will
*Assistant Examiner* — Joan D Misa

(57) ABSTRACT

A combine harvester including a cleaning shoe, having a tailings auger for collection of tailings, a tailings collection bin and apparatus for moving material from the tailings auger to the tailings collection bin.

13 Claims, 4 Drawing Sheets

(56) References Cited

U.S. PATENT DOCUMENTS

| | | | | | |
|---|---|---|---|---|---|
| 2,719,524 | A | * | 10/1955 | Brinkley | A01F 12/30 460/85 |
| 2,821,985 | A | * | 2/1958 | Bretz, Jr. | A01F 11/04 460/13 |
| 2,875,768 | A | * | 3/1959 | Hockey | A01F 12/52 460/14 |
| 3,109,433 | A | * | 11/1963 | Claas | A01F 12/44 460/90 |
| 3,123,235 | A | * | 3/1964 | Tweedale | A01D 41/1208 414/502 |
| 3,348,706 | A | * | 10/1967 | Hyman | A01D 41/1217 414/503 |
| 3,365,086 | A | * | 1/1968 | Young | B60P 1/56 414/502 |
| 3,439,683 | A | * | 4/1969 | Keller | A01F 7/06 460/13 |
| 3,580,257 | A | * | 5/1971 | Teague | A01D 41/1208 460/102 |
| 3,669,125 | A | * | 6/1972 | Rowland-Hill | A01F 12/52 460/13 |
| 3,847,160 | A | * | 11/1974 | De Coene | A01D 41/1208 460/97 |
| 4,208,858 | A | * | 6/1980 | Rowland-Hill | A01F 7/06 460/100 |
| 4,441,511 | A | * | 4/1984 | Schroeder | A01F 12/52 460/13 |
| 10,257,983 | B2 | * | 4/2019 | Bilde | A01F 12/48 |

* cited by examiner

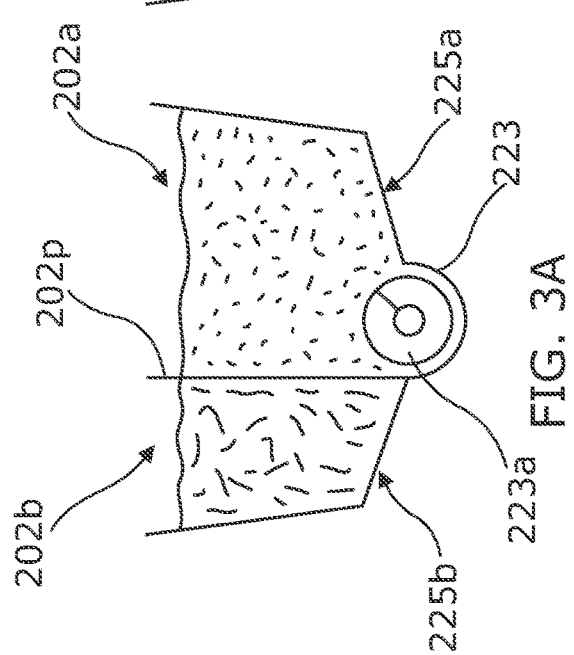
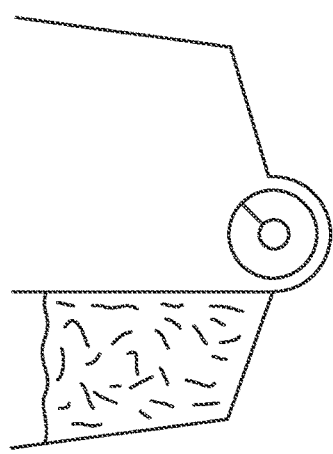
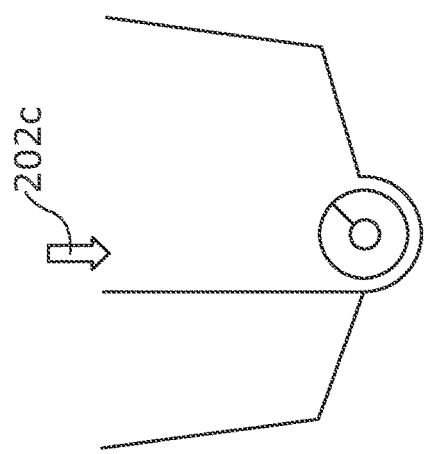
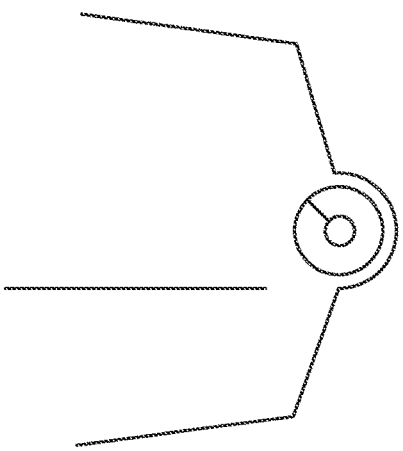
FIG. 3A FIG. 3B FIG. 3C
FIG. 3D FIG. 3E FIG. 3F

COMBINE HARVESTER TAILINGS MANAGEMENT

CROSS REFERENCE TO RELATED APPLICATION

This application claims the benefit of U.S. Provisional Application No. 62/662,810, filed Apr. 26, 2018, which is hereby incorporated by reference in its entirety.

BACKGROUND

Field of Invention

The present invention relates to agricultural harvesting machines. In particular, the invention relates to a cleaning shoe and material handling arrangement for use with a combine harvester.

Description of Related Art

Combine harvesters are typically provided with a 'cleaning shoe' for separating the output of a threshing drum into grain (which is usually desired to be retained) and MOG (Material Other than Grain), which is usually discarded from the combine harvester.

FIG. 1 shows a typical prior arrangement of elements of a combine harvester 001 including elements of a thresher 101, a cleaning shoe 100 and a grain bin 102, which elements will be familiar to one skilled in the art. In this example the thresher is an axial drum thresher with a rotational axis running longitudinal along the combine, but it will be appreciated that other arrangements are possible. The combine harvester of which the shoe comprises a part is considered to be moving in the direction of arrow A.

Crop material is fed into the thresher 101 and is threshed against the concave 103 at the bottom of the drum by the rotor 105. Output from the concave (comprising grain and MOG) falls from the concave onto a first return pan 107 which is angled so as to feed the output, by the action of gravity, via a stratification pan 104 onto the chaffer 109, which is essentially a first sieve, which reciprocates in a generally forwards and backwards motion to sift the grain from the MOG. Return pan 107 and stratification pan 104 are also typically subject to reciprocative or vibratory movement to aid in the passage of the material. Material which falls through the chaffer 109 is then further sifted by sieve 111, which is also normally subject to reciprocative movement. The material which falls through the sieve, which is largely just clean grain by this point, falls onto a clean grain return pan 113 and then down to the clean grain trough and auger 115/115a, which feeds the clean grain ultimately up to a clean grain bin 102, typically disposed on an upper portion of the combine harvester. Lighter and/or less dense material or MOG, such as chaff or pieces of straw, which are present on the chaffer 109 and sieve 111, are typically blown towards and out the back of the machine by a fan 117, which blows air, as illustrated by arrows 117a, 117b up through and/or across the chaffer and sieve respectively. Heavier MOG, such as tailings, typically fall off the back end 109a of the chaffer 109 and onto the tailings return pan 119, which feeds the tailings to tailings trough and auger 121/121a.

Tailings auger trough 121/121a is typically arranged to feed the tailings to a further transport auger which re-feeds the tailings to the threshing drum or, alternatively, ejects them from the machine.

Grain bin 102 is provided with an unloading auger, the first section of which can be seen in the base of grain bin 102 as trough and auger 123/123a, by means of which the clean grain can be unloaded from the combine harvester 001 to another vehicle, a trailer, a silo, or to whatever other unloading point is required.

An issue with this system at present is that in some instances, the 'clean' grain which is collected by the clean grain auger may be relatively heavily contaminated with 'finds' (broken grains), which are smaller than clean grains but heavy enough not to be blown from the chaffer and sieve. This is typical in circumstances where grains are harvested with a high moisture content, such as perhaps 40% by way of example, and where more 'finds' are generated.

A further issue is that in some instances it may be desirable to collect the tailings and/or finds for use.

A solution to these problems would be desirable.

SUMMARY OF INVENTION

Accordingly there is provided in an aspect a combine harvester comprising a cleaning shoe, said cleaning shoe comprising a tailings auger for collection of tailings, wherein said combine harvester further comprises a tailings collection bin and apparatus is provided for moving material from the tailings auger to the tailings collection bin. The advantage of this arrangement is that the tailings can be collected.

In an embodiment, the cleaning shoe may comprise a grain return pan and a clean grain auger, where the grain return pan is situated beneath the chaffer and sieve and directs grain towards the clean grain auger; a tailings return pan for directing tailings towards the tailings auger, the tailings return pan being situated at least partially beneath the grain return pan; and wherein the grain return pan is perforated so as to allow finds to fall through said grain return pan and onto the tailings return pan so that finds are directed towards the tailings auger. This separates the 'finds' from the clean grain and also collects the finds with the tailings.

In an aspect, there is provided grain return pan for a combine harvester, said grain return pan for feeding clean grains to a conveyance device, wherein the grain return pan comprises perforations to allow material smaller than whole harvested grains to fall through.

Where a combine harvester is fitted with a tailings collection bin, the tailings collection bin may comprise a partitioned section of the usual 'main' grain bin. The tailings collection bin may simply be a partitioned section of the main grain bin that is partitioned from a main body of the grain bin by a partition comprising a movable panel.

The grain bin may comprise a trough and auger apparatus, the trough and auger apparatus being situated in the base of the main body of the grain bin.

The partition and the trough and auger apparatus may be arranged such that the contents of the tailings collection bin are allowed to enter the trough and auger apparatus upon opening of the movable panel.

This means that a single trough and auger apparatus will suffice for separately emptying the main clean grain contents and the desirably separate tailings/finds contents from the grain bin.

The floor of the grain bin may have sloping surfaces which slope down towards the trough and auger apparatus. The partitioned section of the grain bin may have one sloping floor surface, and the remainder of the grain bin another.

The partition may be a movable panel which is able to be moved upwards to open it and downwards to close it. A skilled person would recognise that a panel within the partition may perform the same function.

BRIEF DESCRIPTION OF THE DRAWINGS

The invention will now be described in more detail by reference to the attached Figures.

FIGS. 3A to 3F show various configurations of the partition when used to unload the grain bin.

DETAILED DESCRIPTION

Figure 1:
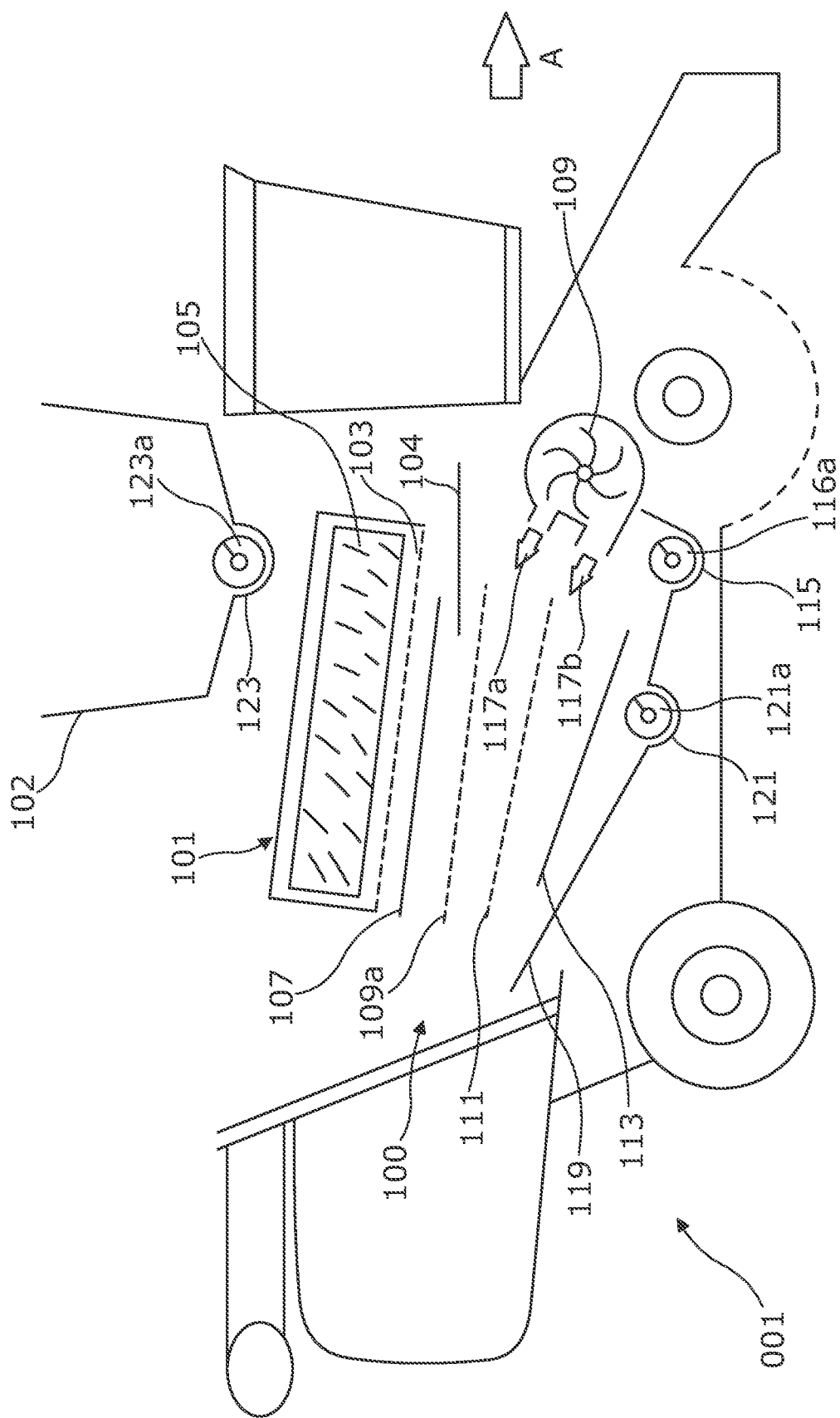
FIG. 1 shows a typical arrangement of elements of a combine harvester as known in the prior art.
Figure 2A:
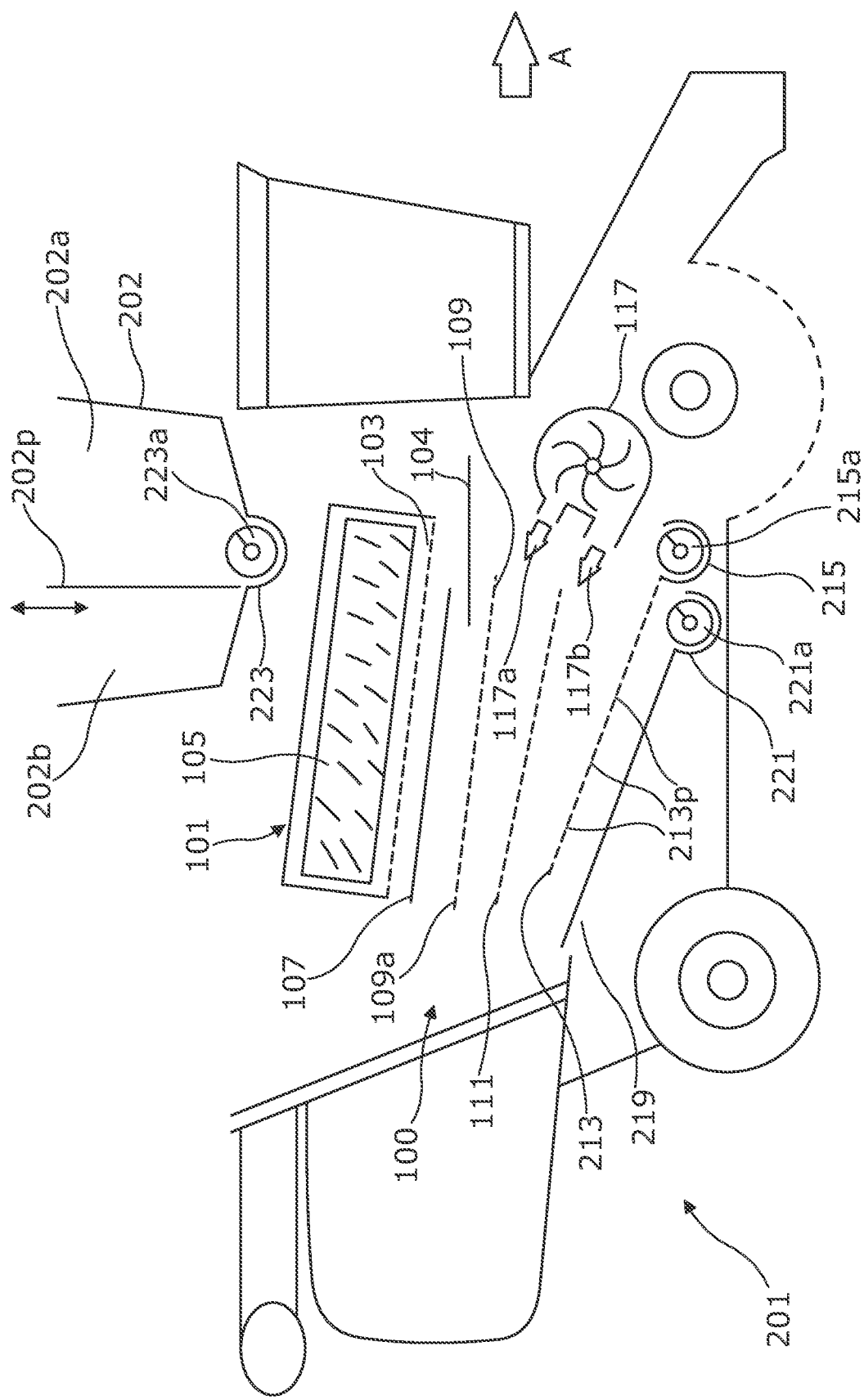
FIG. 2A shows an example embodiment of the invention.

FIG. 2A shows elements of a combine harvester, equivalent to the elements in FIG. 1, of a thresher 101, a cleaning shoe 100 and a grain bin 202, but varied in accordance with aspects and embodiments of the invention. As in FIG. 1, crop material is fed into the thresher 101 and is threshed against the concave 103 at the bottom of the drum by the rotor 105. Output from the concave (comprising grain and MOG) falls from the concave onto a first return pan 107 which is angled so as to feed the output, by the action of gravity, via a stratification pan 104 onto the chaffer 109, which is essentially a first sieve, which reciprocates in a generally forwards and backwards motion to sift the grain from the MOG. Return pan 107 and stratification pan 104 are also typically subject to reciprocative or vibratory movement to aid in the passage of the material. Material which falls through the chaffer 109 is then further sifted by sieve 111, which is also normally subject to reciprocative movement.

The material which falls through the sieve, largely just clean grain by this point, falls onto clean grain return pan 213 and then down to the clean grain trough and auger 215/215a, which feeds the clean grain in a known manner up to a clean grain/main section 202a of grain bin 202, which is disposed on an upper portion of the combine harvester.

In one embodiment, the grain return pan 213 is perforated, with perforation of a size such that clean whole grains feed down to trough/auger 215/215a as expected, but 'finds' fall through the grain return pan 213 and onto tailings return pan 219, where they feed down to tailings trough and auger 221/221a.

In one embodiment, a grain return pan is provided for feeding clean grains to a conveyance device which may be a trough and auger, wherein the grain return pan comprises perforations to allow material smaller than whole harvested grains to fall through. The material may include 'finds'. The grain return pan may be situated above a tailings return pan such that the material which falls through the grain return pan is collected alongside tailings. The tailings return pan may direct tailings and finds to a conveyance device which may be a trough and auger apparatus.

As in FIG. 1, lighter or less dense material or MOG, such as chaff or pieces of straw, which are present on the chaffer 109 and sieve 111, are typically blown towards and out the back of the machine by a fan 117, which blows air 117a, 117b up through and/or across the chaffer and sieve respectively. Heavier MOG, such as tailings, will fall off the back end 109a of the chaffer 109 and onto the tailings return pan 219, which feeds the tailings to tailings trough and auger 221/221a.

In one embodiment of the invention, tailings auger trough 221/221a is arranged to feed the mixture of tailings and finds to a further transport auger 222/222a (not shown in FIG. 2A) which feeds the tailings and finds to tailings collection bin 202b which in this embodiment is a partitioned section of the grain bin 202. Grain bin 202 is partitioned into clean grain/main section 202a and tailings collection bin section 202b by partition 202p. Partition 202p is a movable door which can open vertically upwards. In FIG. 2A, partition 202p is shown in the closed position. As can be seen, partition 202p when in the closed position will prevent the contents of tailings collection section 202b from entering unloading trough and auger assembly 223/223a.

Figure 2B:
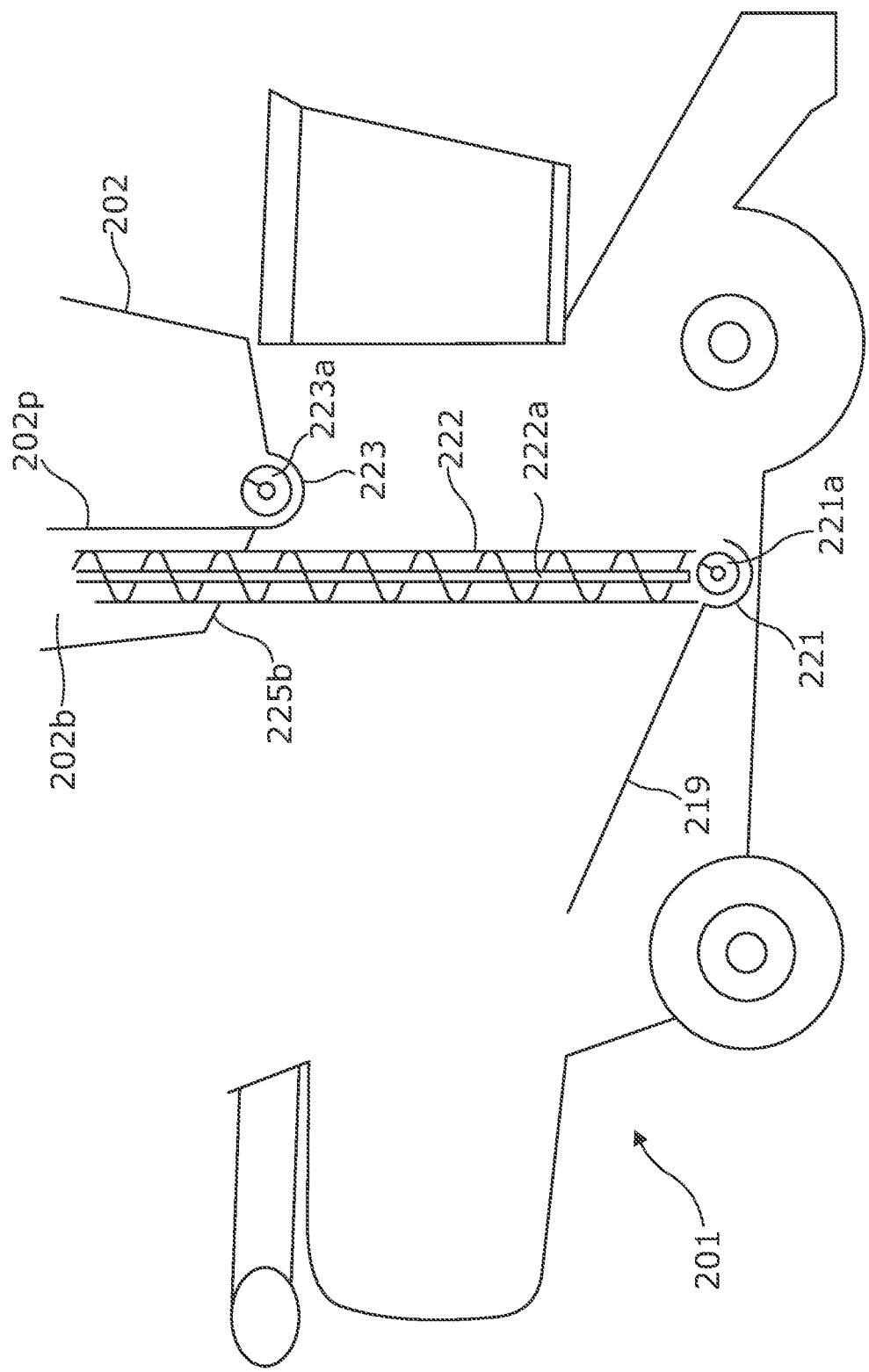
FIG. 2B shows an example of a conveyance embodied by the invention.

FIG. 2B shows an example embodiment of a conveyance, in this case an auger tube/auger apparatus 222/222a, for transporting tailings and finds from the tailings auger and trough 221/221a to the tailings collection bin portion 202b of the grain bin 202, wherein the tube/auger apparatus 222/222a connects the end of the tailings auger/trough 221/221a to the tailings collection bin 202b and enters the bin 202b through the floor surface 225b of the tailings collection bin. The other parts of the combine which are shown in FIG. 2A have been deleted for clarity of this element. The skilled person will recognise this as merely one solution to the conveyance of tailings and finds from the tailings auger 221/221a to the tailings bin 202b.

In one embodiment, there is provided a conveyance device for a combine harvester for conveying tailings to a collection bin. The collection bin may be a separate bin on the combine harvester or may be a section of a larger bin. 'Finds' may also be conveyed and collected along with the tailings. The conveyance device may comprise one or more trough and auger apparatuses.

FIGS. 3A to 3F show the use of the partition 202p to unload the grain bin 202.

In FIG. 3A, both clean grain section 202a and tailings collection section 202b have an amount of material in them. In accordance with aspects of the application, this material will have been collected from clean grain trough and auger 215/215a and from tailings trough and auger 221/221a respectively. Clean grain section 202a therefore has 'clean' grain in it, and tailings collection section 202b has tailings and 'finds' in it. It is desirable to unload these sections separately so that the materials are kept separated—but it is also not desirable to have to provide an unloading system, including for example a trough and auger, for both sections. Instead, the overall grain bin 202 is provided with a single trough and auger 223/223a.

FIG. 3B shows the clean grain section 202a of the bin 202 being unloaded by means of the trough and auger 223/223a. The trough and auger 223/223a are activated and the clean grain is transported by the trough and auger 223/223a, as shown by arrow 223u, to a further unloading device, which may be a further auger, in order to unload the grain to, for example, a trailer pulled by a tractor.

FIG. 3C shows that the clean grain section 202a is now empty, whilst tailings collection section 202b still retains material.

FIG. 3D shows that partition 202p has been raised (as indicated by arrow 202r), allowing material (tailings and finds) from tailings collection section 202b to travel downwards (as illustrated by arrow 223v) into the unloading trough and auger 223/223a, whereupon the auger 223a is also activated so as to unload the tailings and finds in similar manner to the unloading of the grains, but to a different location, such as for example a different trailer pulled by another tractor.

FIG. 3E shows that the tailings and finds have all been unloaded and that both sections 202a and 202b of the bin 202 are now empty.

FIG. 3F shows that the partition 202p is closed (in direction of arrow 202c) such that the empty bin 202 is now ready for refilling whilst retaining separation between the clean grain section 202a and tailings collection section 202b, so that clean grain and tailings/finds can be collected separately within the bin 202.

It can be seen from all FIGS. 3A to 3F that the floor of bin 202 is provided with two sloping floor sections 225a and 225b at the base of the clean grain section 202a and the tailings collection section 202b respectively, the purpose of which is to ensure that contents of the bin sections are directed by action of gravity towards the trough and auger 223/223a.

In one embodiment of the invention there is provided a grain bin for a combine harvester comprising a clean grain section and a tailings collection section. The two sections are divided by a partition. The partition may be movable between a closed and an open position. The partition may be movable vertically. The partition may comprise a door movable between a closed and an open position. The door may be movable vertically. The grain bin may be provided with a trough and auger. The floor of the grain bin may slope downwards towards the trough and auger. The floor of the grain bin may be divided into a clean grain floor section and a tailings collection floor section, and at least a part of both floor sections may each slope downwards towards the trough and auger. The trough and auger may be situated primarily in the base of the clean grain section.

Clearly the skilled person will recognize that various aspects, embodiments and elements of the present application, including as illustrated in the figures or described above, may be arranged in differing combinations, any and all of which may be considered to fall within the ambit of the inventive concept. The invention will be defined by the following claims.

The invention claimed is:

1. A combine harvester comprising:
   a cleaning shoe comprising:
      one or more sieves operable to reciprocate and to sift grain from material other than grain;
      a tailings return pan arranged to collect tailings falling from a back end of the one or more sieves and to feed the tailings to a tailings auger;
      a grain return pan;
      a clean grain auger, wherein the grain return pan is situated beneath said one or more sieves and is arranged to direct said grain towards said clean grain auger;
      wherein the tailings return pan is situated at least partially beneath said grain return pan, wherein said grain return pan is perforated so as to allow finds to fall through said grain return pan and onto the tailings return pan so that said finds are directed towards the tailings auger;
   a grain bin;
   a tailings collection bin, wherein the tailings collection bin comprises a partitioned section of the grain bin; and
   an apparatus for moving said finds and said tailings from the tailings auger to the tailings collection bin.

2. The combine harvester as claimed in claim 1 in which the tailings collection bin is partitioned from a main body of the grain bin by a partition comprising a movable panel.

3. The combine harvester as claimed in claim 2 wherein the grain bin comprises a trough and auger apparatus, said trough and auger apparatus being situated in the base of the main body of the grain bin.

4. The combine harvester as claimed in claim 3 wherein said finds and said tailings within the tailings collection bin are allowed to enter the trough and auger apparatus upon movement of the movable panel from a closed position, wherein said finds and said tailings are prevented from entering the main body of the grain bin, to an open position wherein said finds and said tailings may enter the main body of the grain bin.

5. The combine harvester as claimed in claim 3 wherein the tailings collection bin and the main body of the grain bin comprise floor surfaces that slope down towards the trough and auger apparatus.

6. The combine harvester as claimed in claim 2 wherein the partition comprises a movable panel which is movable in a vertical direction.

7. The combine harvester as claimed in claim 1, wherein the apparatus is an auger apparatus.

8. A combine harvester comprising:
   a cleaning shoe comprising:
      one or more sieves operable to reciprocate and to sift grain from material other than grain;
      a tailings return pan arranged to collect tailings falling from a back end of the one or more sieves and to feed the tailings to a tailings auger;
   a grain bin;
   a tailings collection bin, wherein the tailings collection bin comprises a partitioned section of the grain bin; and
   an apparatus for moving the tailings from the tailings auger to the tailings collection bin.

9. The combine harvester as claimed in claim 8 in which the tailings collection bin is partitioned from a main body of the grain bin by a partition comprising a movable panel.

10. The combine harvester as claimed in claim 9 wherein the grain bin comprises a trough and auger apparatus, said trough and auger apparatus being situated in the base of the main body of the grain bin.

11. The combine harvester as claimed in claim 10 wherein contents of the tailings collection bin are allowed to enter the trough and auger apparatus upon movement of the movable panel from a closed position, wherein tailings are prevented from entering the main body of the grain bin, to an open position wherein tailings may enter the main body of the grain bin.

12. The combine harvester as claimed in claim 10 wherein the tailings collection bin and the main body of the grain bin comprise floor surfaces that slope down towards the trough and auger apparatus.

13. The combine harvester as claimed in claim 9 wherein the partition comprises a movable panel which is movable in a vertical direction.

* * * * *